United States Patent [19]

Reinauer

[11] 3,716,971
[45] Feb. 20, 1973

[54] METHOD OF FILTERING
[76] Inventor: Thomas V. Reinauer, 9 Dunnder Drive, Summit, N.J. 07091
[22] Filed: March 29, 1971
[21] Appl. No.: 129,057

Related U.S. Application Data

[63] Continuation-in-part of Ser. No. 713,864, March 18, 1968, Pat. No. 3,630,005.

[52] U.S. Cl. ...........................55/96, 55/302, 55/341
[51] Int. Cl. ...............................................B01d 46/04
[58] Field of Search..........55/284, 96, 291, 293, 300, 55/301, 302, 303, 341, 286, 287; 210/323, 333, 410, 411, 335

[56] References Cited

UNITED STATES PATENTS

| 1,509,912 | 9/1924 | Stebbins | 55/303 X |
|---|---|---|---|
| 2,804,168 | 8/1957 | Church | 55/302 X |
| 3,158,455 | 11/1964 | Lincoln | 55/292 |
| 3,325,979 | 6/1967 | Smith | 55/302 |
| 2,964,129 | 12/1960 | Labbe | 55/293 X |
| 3,095,289 | 6/1963 | Egan | 55/96 X |
| 3,146,080 | 8/1964 | Ruble et al. | 55/96 |
| 3,375,641 | 4/1968 | Labbe | 55/293 |
| 3,383,840 | 5/1968 | Johnson et al. | 55/293 |
| 3,385,033 | 5/1968 | Basore et al. | 55/302 |
| 1,163,318 | 12/1915 | Bryant | 55/293 |

FOREIGN PATENTS OR APPLICATIONS

| 651,008 | 9/1951 | Great Britain | 55/482 |

Primary Examiner—Tim R. Miles
Assistant Examiner—William A. Cuchlinski, Jr.
Attorney—Robert E. Isner and Peter J. Franco

[57] ABSTRACT

Method of affecting separation of particulate matter from a gaseous carrier by selective subdivided passage of said carrier through a plurality of discrete filter chambers disposed in vertical superposed relation interconnected by a vertically oriented conduit member that is constituted, at least in part, by permeable filter medium that forms a portion of the defining walls of each such chamber. The invention also includes an improved cleaning method wherein the filter media associated with each discrete and vertically superposed filter chamber is subjected to cleaning in predetermined sequence that is directionally concurrent to the direction of particulate matter displacement toward a receiving hopper and wherein the lower portions of the filter media are preferentially subjected to an effectively greater quanta of cleaning than the upper portions thereof.

9 Claims, 4 Drawing Figures

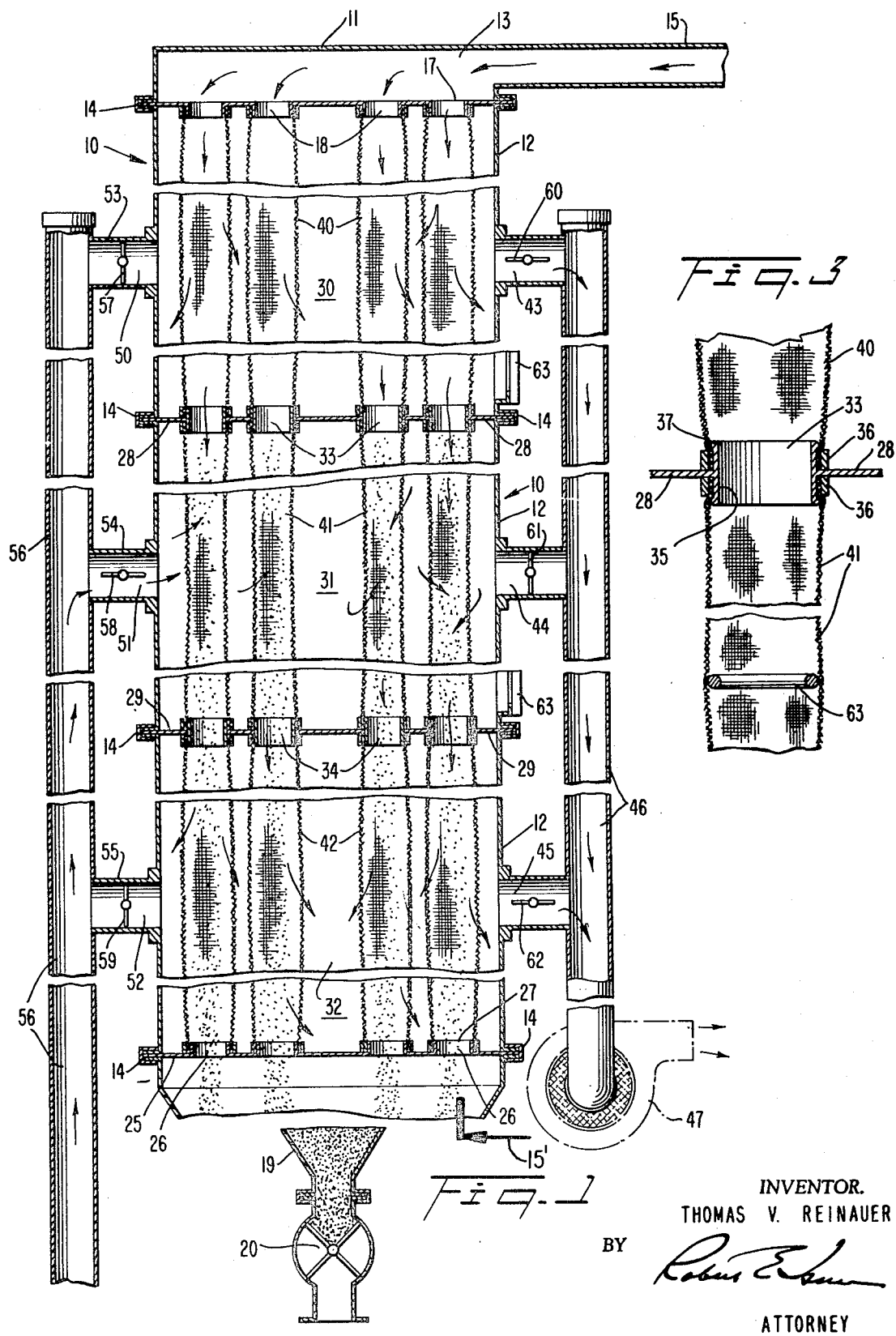

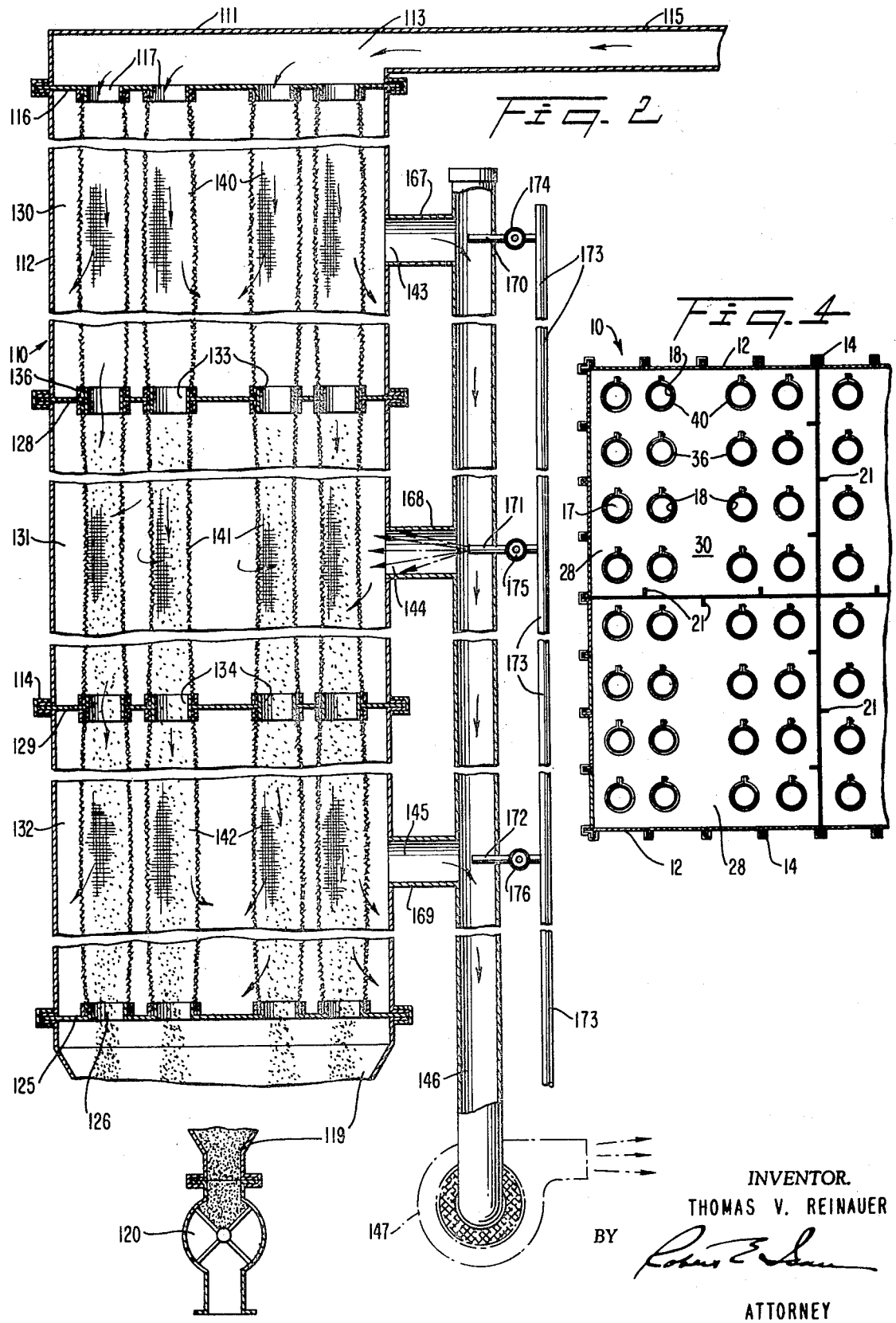

METHOD OF FILTERING

This application is a continuation-in-part of my application, Ser. No. 713,864 filed Mar. 18, 1968, now U.S. Pat. No. 3,630,005.

This invention relates to the separation of solid particulate matter from gaseous carriers and particularly to improved methods for effecting the separation and collection of such particulate matter by passage of such gaseous carriers through permeable filter media.

Over the years many specific forms of apparatus have been proposed and constructed to achieve separation of solid particular matter from gaseous carriers by selective passage of the latter through permeable filter media together with many proposals for and constructions of apparatus and associated methods for maintaining the permeability of the filter medium by periodically effecting the removal therefrom of at least some of the solids that accumulate thereon, preferably without undue disturbance of the over-all continuity of the separation operation. The most widely used conventional construction for apparatus of the above character utilized for commercial dust collection incorporates the use of pluralities of vertically disposed tubular filter socks disposed intermediate a plenum and a hopper and with periodic cleaning thereof being effected by shaking or agitation of the dust-laden bags or by reverse flow of gas therethrough or by a combination thereof. In the handling of large volumes of gas, the inherently possessed advantages of the efficient use of floor space and the efficient use of structural steel and associated structural enclosing elements have led to the widespread use of multicompartmented vertically oriented units of the type generally described above.

The ever increasing present day concern with air pollution and the pressures of continually rising costs have created a demand for dust collection apparatus of increased capacity, oftentimes with a capability of handling gaseous carriers of elevated temperatures, and the art has generally turned to vertically oriented units of increased height in their efforts to solve the problems presented. Unfortunately, however, such vertical extension persents problems of increasing, if not of accelerating, magnitude as the height of the units is increased. Among these problems, many of which are accentuated when high temperature gases are being handled, is a necessary increase in filter bag diameter as the bag length increases, an increased reliance upon spreader rings or other expedients to prevent bag collapse during clearing, complication of the cleaning mechanisms due, at least in part, to the practical operational unsuitability of conventional cleaning techniques for bag lengths beyond about 25 to 30 feet because, inter alia, of the excessive amplitudes of bag displacement that then accrue and markedly increased operating stresses upon the filter bags, particularly at the terminal mounting locations thereof; generally shortened bag life, increased difficulty in handling and installing filter bags, increased difficulty in the obtaining and maintaining of proper bag tensions and an attendant general complication of structure to permit convenient access to the unit for maintenance and repair operations, all of which not only constitute a substantial counterbalance to the advantages inherent in vertically oriented units but cooperate to effectively lower the performance characteristics of the unit and to markedly increase the operating and maintenance expense thereof.

The invention includes, in its broad aspects, the provision of an improved method of separating particulate matter from a gaseous carrier by selective subdivided passage of such carrier through a plurality of discrete filter chambers disposed in vertical, superposed relation interconnected by a common vertically oriented dirty gas conduit constituted at least in part of permeable filter medium forming the gas inlet to, and a portion of the defining walls of each such chamber. In its narrower aspects the subject invention includes selectively subjecting the filter medium associated with each of said filter chambers to an independent cleaning operation without interruption of a continuous flow of gaseous carrier, in a preferred mode of operation, down through the vertically oriented dirty gas conduit toward a material collection hopper disposed at the lower end thereof. Still another aspect of the invention is the provision of an improved method of cleaning such vertically superposed filter chambers wherein the filter media associated with such chambers are subjected to an effective quanta of cleaning that varies inversely with their relative height and wherein, for example, the lower chambers are subjected to a greater quantum of cleaning than the chambers disposed thereabove.

Among the advantages of the subject invention is the permitted realization, for vertically oriented units of extreme height, of the advantages inherent in vertically oriented units with a concomitant minimization, if not effective avoidance, of most, if not all, of the above-named problems that have been heretofore attendant increases in height thereof. Among the same are included the permitted use of filter bags or socks of optimum character and length for any particular set of operating parameters with a concomitant increase in operational characteristics and decrease in installation and maintenance problems and the permitted utilization of different cleaning techniques for renewing the permeability of the filter medium. Still another advantage attendant the subject invention is the permitted utilization, in vertically oriented dust collection apparatus constructed in accord with the principles outlined herein of predetermined selected modes of operation for effecting cleaning of the filter medium, some of which, at least, effect a marked enhancement of the over-all operating characteristics and capacity of the units.

The primary object of this invention is the provision of an improved method for effecting the separation of particulate matter from gaseous carriers.

A still further object of this invention is the provision of improved methods of operation for vertically oriented dust collectors.

Other objects and advantages of the subject invention will become apparent from the following portions of this specification and from the appended drawings which illustrate, in accord with the dictates of the patent statutes the essentials of presently preferred apparatus incorporating the principles of the invention.

Referring to the drawings:

FIG. 1 is a schematic vertical sectional view of a dust collector construction embodying the principles of this invention, as adapted to utilize a reverse flow cleaning technique;

FIG. 2 is a schematic vertical sectional view of a dust collector of the type shown in FIG. 1 as adapted to utilize pulse jet type of cleaning technique;

FIG. 3 is an enlarged sectional view of a portion of a tube sheet showing one means for mounting the ends of the filter bags thereto; and FIG. 4 is a horizontal sectional view as taken intermediate the tube sheets and illustrating the combining of modular sections thereof.

Referring initially to FIGS. 1 and 4 there is illustrated, in somewhat schematic form, a dust collector device made up of a plurality of vertically superposed discrete filter chambers. By way of illustrative example such a device may include an upright, elongate housing, generally designated 10, of convenient external configuration, suitably of generally rectangular or cylindrical cross-section. Conveniently, the outer housing 10 may be constituted to facilitate easy assembly in module-like blocks from a plurality of readily prefabricated uniformly sized flanged panels or segments, generally designated 12. In a preferred construction, the mating flanges on the segments 12 are sized so as to be disposed, with associated gasket material, within U-shaped caps or clamping members 14 which, in association with auxiliary bolts or the like, cooperatively function to provide for an essentially airtight housing construction. Alternatively such housing can be fabricated of longer sections that are welded together. In all cases, however, the subject construction lends itself to appreciable degrees of prefabrication at ground level either at the erection site or at locations remote therefrom which not only permit economy of fabrication but markedly simplifies the problems, both as to equipment and personnel, of erecting the unit at the point of use.

The upper portion of the housing 10 terminates in a cap member 11 which defines, in cooperation with a transversely disposed upper tube sheet 16, an entry or dirty air plenum chamber 13 into which the gaseous carrier, usually air or the gaseous effluent from a furnace or the like, having the particulate matter entrained therein is introduced via the dirty gas entry conduit 15. Incorporated in the upper tube sheet 16 are a plurality of circular apertures 17 peripherally defined or bounded by dependent relatively short collar members 18.

The lower portion of the housing 10 terminates in a conically shaped hopper 19 having a rotary airlock type valve, generally designated 20, at the bottom thereof. The hopper 19, in conjunction with a transversely disposed lower tube sheet 25 incorporating a plurality of circular apertures 26 disposed in coaxial longitudinal alignment with the aperture 17, each peripherally defined or bounded by an upwardly directed relatively short collar member 27, defines a particulate matter receiving chamber.

Disposed intermediate the upper and lower tube sheets 16 and 25 respectively and in predetermined relation therewith and with each other are one or more transversely disposed intermediate tube sheets, as for example the tube sheets 28 and 29 in the exemplary illustrated three chamber structure. Any number of intermediate tube sheets may be employed in accord with the number of discrete filter chambers of selected dimension that will be required for any given installation.

Each of the intermediate tube sheets 28 and 29 is provided with complementally sized apertures 33 and 34 disposed in coaxial longitudinal alignment with the corresponding apertures 17 and 26 respectively in the upper and lower tube sheets. As shown in enlarged scale in FIG. 3, each of the apertures 33 and 34 is peripherally defined or bounded by a short sleevelike collar 35 that extends both upwardly and downwardly from the plane of the tube sheet. Preferably the terminal edges thereof are selectively contoured to provide, for example, inwardly or outwardly directed beads 37 or the like so as to form a socket-like receptacle for clamping rings 36 or other filter media securing expedients. In the illustrated arrangement, the external housing 10 in conjunction with each contiguous or adjacent pair of tube sheets serves to define, in part, a discrete filter chamber and such elements collectively serve to define, again in part, a plurality of such discrete filter chambers disposed in vertical superposed relation. In the illustrative example, the external housing 10 together with the tube sheets 16 and 28 serve to cooperatively define, in part, a first and uppermost filter chamber 30 disposed immediately above a second or intermediate filter chamber 31 that is cooperatively defined, again in part by the intermediate tube sheets 28 and 29 and the surrounding housing 10. In a similar manner the tube sheets 29 and 25 in association with the surrounding housing 10 define, in part, a third and lower most discrete filter chamber 32. Each chamber desirably includes an access hatch 37.

Secured, as by clamping rings 36, to each pair of facing coaxially aligned collars 18, 33 in the tube sheets 16 and 28 respectively are the terminal end portions of a cylindrical filter bag or sock 40. The filter bags 40 may be constructed of any suitable permeable filter medium, preferably of a non-rigid character such as fabric, which may be of any fibrous material, either natural or synthetic spun into yarn and then woven or impacted, bonded or otherwise formed into a felt. The permeable media filter bags 40 thus so disposed intermediate the tube sheets 16 and 28 are in direct communication through the apertures 17 to the dirty gas entry plenum 13 and thereby serve to constitute, in conjunction with the aforesaid tube sheets 16 and 28 and the adjacent surrounding portions of the housing 10, a portion of the defining walls of the upper filter chamber 30 as well as an extension of the dirty gas conduit system. In a similar manner the filter socks 41, terminally secured to the facing segments of the collars 33 and 34 intermediate the tube sheets 28 and 29 constitute extensions of the coaxially aligned filter socks 40 as well as a portion of the defining walls of the intermediate or second filter chamber 31. Likewise the filter socks 32 terminally secured to the facing segments of the collars 34 and 27 intermediate the tube sheets 29 and 25 constitute extensions of the coaxially aligned filter socks 40 and 41 as well as a portion of the defining walls of the lower or third filter chamber 32. As will now be apparent the subject construction results in vertically oriented dirty gas conduits of substantially uniform cross-sectional configuration and having a lineally continuous longitudinal axis.

Each of the discrete filter chambers 30, 31 and 32 is provided with a clean gas outlet vent, such as the vents 43, 44 and 45 respectively connected to a common clean gas exhaust line 46, through which, for example, gas may be drawn by a downstream fan 47 or the like. For convenience, each of the filter chambers will be desirably provided with an individual access door or the like together with associated structural accessories such as catwalks and ladders to facilitate entry thereto for maintenance operations.

In accordance with the principles of this invention, the gaseous carrier having the particulate matter entrained therein is introduced into the plenum 13 through the conduit 15 under a driving force which may be provided, for example, by the fan 47, or other prime mover, not shown, disposed downstream in the clean gas exhaust line 46. The dirty gas, i.e., the gaseous carrier together with the entrained particulate matter, is then diverted, in normal filtering flow, through the apertures 17 in the upper tube sheet 16 into the filter socks 40 which, as pointed out above, serve, in conjunction with the coaxially aligned filter socks 41 and 42, as extensions of the dirty gas conduit system. Under such normal flow conditions, a portion of the gaseous carrier will pass through the walls of the filter socks 40 and into and through the first filter chamber 30, leaving the particulate matter entrained therein on or in the permeable media. Concurrently therewith other portions of the gaseous carrier will continue moving downwardly and will pass through the filter socks 41 and 42 and into and through the second and third filter chambers 31 and 32 respectively. The direction of gas flow within the dirty gas portion of the illustrated system is always directed toward the material receiving hopper 19 and because of the apportioned removal of gaseous carrier through each of the discrete filter chambers 30, 31 and 32 the velocity of the gaseous carrier will be at a maximum immediately after passage through the apertures 17 in the upper tube sheet 16 and will decrease to substantially zero in the vicinity of the apertures 26 in the lower tube sheet 25.

The described mounting of pluralities of discrete filter chambers in vertical superposed relation effectively removes the height limitations heretofore attendant vertically oriented dust collectors. In fact, the subject construction appears to make possible over-all heights which are limited only by such high velocities of the gaseous carrier as would create an undue abrasive action on the permeable filter media employed. By way of example, if it be estimated that the maximum downward velocity of the gaseous carrier bearing the entrained particulate matter that could be tolerated for a given filter medium should not exceed 1,000 ft. per minute, such would, at an assumed gas to permeable media passage ratio of 2 cu. ft. per minute per square foot of filter media, permit utilization of an effective total bag length in the neighborhood of 110 ft. using conventional 11 inch diameter bags. Such heights are, of course, practically unattainable in conventional constructions but could be here easily attained by the vertical superposition of eleven discrete filter chambers, each of a height of 10 feet.

As is well known, at least a portion of the solid particulate matter which collects on the upstream side of and in the permeable filter medium during the normal filtering flow operations as described above must be dislodged therefrom from time to time in order to maintain permeability of the filter medium at an acceptable level, i.e., at a level at which, under a given set of conditions of use, the over-all dust collection unit or system is capable of performing its function at a desired rate of gas flow. Basically, dust collection systems are designed to either provide essentially continuous uninterrupted gas flow to and through the system, in which case the dislodging of the collected gas must be performed during this continuous operation, or to provide a programmed, and usually short term, stoppage of the gas stream during which stoppage the dislodging of the dust may be performed.

Cleaning of the permeable media associated with each filter chamber may be effected with or without interruption of the flow through a particular filter chamber whilst normal filter operations are being continued in the remaining filter chambers, and moreover such cleaning may, because of the effectively short length of filter bags employed, utilize techniques that were not heretofore available for conventional vertically oriented units of any appreciable size. More particularly stated, known cleaning techniques such as "reverse flow" cleaning and various types of "pulse-jet" cleaning can readily be incorporated and utilized to advantage. In the use of such "pulse-jet" techniques, the operation of the units being subjected to cleaning are not mechanically interrupted or isolated from the remainder of the units of the assemblage. Instead, an abrupt burst of high energy gas is released countercurrent to the normal filter flow and over a cross-sectional area of an opening of a filter chamber thereby at once stopping and reversing normal filter flow and causing an abrupt and momentary pressure rise in the downstream face of the filter medium. Such pulse-jet method and cleaning technique utilizing either single pulses as disclosed in Church, U.S. Pat. No. Re. 24,954 or a series of pulses of particular character to effect dislodgement of dust by a gas movement induced shaker type displacement of the filter media, as disclosed in U. S. Pat. No. 3,368,328, may be employed and incorporated in the subject apparatus.

By way of further example, the dust collector construction illustrated in FIG. 1 includes provision for selectively effecting reverse flow cleaning of the permeable filter media associated with each of the discrete filter chambers 30, 31 and 32. To the above end, each of the filter chambers 30, 31 and 32 is provided with an individual clean or backwash gas entry aperture as illustrated at 50, 51 and 52 connected by suitable conduit sections 53, 54 and 55 respectively to a common clean or backwash gas supply conduit 56. Disposed in each of the conduit sections 53, 54 and 55 are rotatably displaceable damper members 57, 58 and 59 respectively. In a like manner, rotatably displaceable damper members 60, 61 and 62 are included in the conduit segments interconnecting the individual clean gas exit apertures 43, 44 and 45 for each of the filter chambers to the common clean gas exhaust line 46. Under normal filtering flow operation, the dampers 57, 58 and 59 are maintained in closed position and the dampers 60, 61 and 62, are maintained in the open position. Selectively initiated reverse flow cleaning of the permeable filter medium associated with any of the discrete filter chambers is readily effected by manipulation of the pair of dampers associated therewith. For example, cleaning of the filter socks 41 associated with filter chamber 31 is effected by opening damper 58 in the backwash gas inlet conduit 54 and closing damper 61 in the clean gas exit conduit substantially concurrently therewith. The closure of damper 61 effectively interrupts the normal filtering flow through the filter chamber 31 and through the filter socks 41 and the opening of the damper 58 permits backwashing as, at a sufficiently high pressure differential, to initiate a reverse flow thereof through the filter socks 41, causing the same to belly inward as indicated, and to effect a dislodgement of at least portions of the solid particulate matter that has accumulated either in or on the inner surface thereof during normal filtering flow. While the reverse flow cleaning of the permeable media associated with filter chamber 31 is being effected, normal filtering flow operations continue through the adjacent filter chambers 30 and 32 with a concomitant continuance of the normal downwardly directed flow of gaseous carrier through the longitudinally aligned filter socks, including the filter socks 41, which flow serves to re-entrain and downwardly displace the dust that has been dislodged from the socks 41 during the reverse flow cleaning period. Subsequent to a desired period of reverse flow cleaning, the filter chamber 31 is readily returned to normal filtering flow operations by the reopening of the damper member 61 and a substantially concurrent closure of the damper 58 in the clean or backwash gas entry conduit 54. In a similar manner, each of the other discrete filter chambers can be selectively subjected to a reverse flow cleaning operation at any desired time and for any desired duration by mere manipulation of the damper members associated therewith in the manner described above.

As will now be apparent, the continuity of the normal downwardly directed flow of gaseous carrier through all of the longitudinally aligned filter socks during the cleaning operation, save those disposed in the lowermost filter chamber acts to continually direct the particulate matter toward the hopper 19. While the dust dislodged from the filter socks 42 in the lowermost chamber in any assemblage will not normally be subjected to a downwardly directed flow of gaseous carrier during the cleaning process, the resumption of normal flow following the cleaning cycle together with the minimal velocities normally extant therewithin will minimize re-entrainment of the dust on the permeable filter media in said lowermost section and will assure disposition of at least appreciable portions thereof within the material receiving hopper A.

FIG. 2 illustrates a dust collector device of essentially the same character as that illustrated in FIG. 1 and described in detail above except that the unit here shown is adapted to employ "pulse-jet" type cleaning techniques. As illustrated, the subject unit includes an upright elongate housing, generally designated 110, upwardly terminating in a cap member 111 which defines, in cooperation with a transversely disposed upper tube sheet 116, an entry or dirty gas plenum chamber 113 into which the gaseous carrier having the particulate matter entrained therein is introduced by the dirty gas entry conduit 115. The lower portion of the housing terminates in a material receiving hopper 119 having an airlock type valve, generally designated 120, at the dependent end thereof. Disposed immediately above the hopper 119 is a lower tube sheet 125 having a plurality of apertures therein disposed in coaxial alignment with similar apertures 117 in the upper tube sheet 116. Disposed intermediate the upper and lower tube sheets 116 and 125 and in predetermined spaced relation therewith and with each other are one or more transversely disposed intermediate tube sheets, as for example, the tube sheets 128 and 129. Each of the intermediate tube sheets is provided with complemental apertures 133 and 134 disposed in coaxial longitudinal alignment with the apertures in the upper and lower tube sheets. As previously described in detail in conjunction with the structure of FIG. 1, the inclusion of filter socks of permeable media intermediate each adjacent pair of tube sheets, as for example, the filter socks 140, 141 and 142 respectively, serves to define a plurality of discrete filter chambers 130, 131 and 132 disposed in vertical superposed relation.

Each of the discrete filter chambers 130, 131 and 132 is provided with a clean gas outlet vent, such as vents 143, 144 and 145, respectively connected to a common clean gas exhaust line 146 through which, for example, gas may be drawn by a downstream fan or other prime mover. In operation of the illustrated unit, the gaseous carrier having the particulate matter entrained therein is introduced into the plenum 113 through the conduit 115 under a driving force which may be provided, for example, by a fan 147, or other prime mover, not shown, disposed downstream in the clean gas exhaust line 146. The dirty gas, i.e., the gaseous carrier together with the entrained particulate matter, is then directed in normal filtering flow through the apertures 117 in the upper tube sheet 116 into the filter socks 140 which serve, in conjunction with the coaxially aligned filter socks 141 and 142, as extensions of the dirty gas conduit system. Under such normal flow conditions a portion of the gaseous carrier will pass through the walls of each of the respective filter socks 140, 141 and 142 and into and through the filter chambers 130, 131 and 132 respectively, leaving the particulate matter entrained therein on the surface of or in the permeable filter media. The cleaned gas will then exit from the respective filter chambers through the exit vents 143, 144 and 145 and through the conduit sections 167, 168 and 169 interconnecting said exit vents with the common clean air exhaust line 146.

Provision for pulse jet type of cleaning of the permeable filter media is readily effected by including in the clean gas conduit system downstream of each of the clean gas outlet vents 143, 144 and 145 for the filter chambers 130, 131 and 132 respectively, jet pipes such as the pipes 170, 171 and 172. The pipes 170, 171 and 172 are connected to a header 173 constituting a source of high energy cleaning gas through individual quick acting valves 174, 175 and 176, the arrangement being that there may be released at the ends of the pipes 170, 171 and 172 pulses of high energy gas. In the practice of the invention, the points of release of the pulses, i.e., at the ends of the respective pipes 170, 171 and 172, are positioned to deliver the high energy pulses oppositely to the direction of normal filtering flow of clean gas (whether or not such flow is actually in progress) and entirely across a cross-sectional area of a path of said clean gas flow. In the illustrated apparatus the points of release are located in substantially coaxial alignment with the axes of the conduit segments 167, 168 and 169 downstream of the clean gas exit vents 143, 144 and 145 respectively and are spaced therefrom so as to ensure that the pulse jet of high energy gas issuing from each of said points of release will as they expand in their environment, selectively generates about a 15° cone that contains about 98 of the available energy in the gas which extends across the entire cross-sectional area of said conduit segments.

As mentioned earlier, the pulse jet cleaning techniques employable in conjunction with the described apparatus may include single pulse operation as disclosed in Church, U.S. Pat. No. 24,954 or multi-pulse operation as, for example, of the type disclosed in U. S. Pat. No. 3,368,328 and electrical controls of usual circuitry and solenoid actuated quick operating valve assemblies of conventional nature and not here shown, are includable to operate the valves 174, 175 and 176 in any desired manner to thereby allow the operator to program a release of any desired series of pulses at any of the points of release specified in the individual filter chambers.

Turning now to the preferred practices of the invention within the context of an elongate vertically disposed filter media interconnecting a plurality of discrete filter chambers and which is traversed at least in part by a downwardly directed dirty gas stream, experimental results obtained to date indicate that improved gas handling capacity is obtained when the filter socks are generally progressively subjected, at least in part, to sequenced cleaning operation in the direction of dirty gas flow and marked enhancement in gas handling capacity is obtained when the lower portions of the media are subjected to preferentially greater effective cleaning operations than are the upper portions thereof. Such cleaning operations can be generally of any suitable character and the preferential differentiation between the upper and lower portions of the filter media may be obtained by localized expenditures of greater amounts of cleaning power, localized utilization of different types of cleaning, increased cleaning periods or by any other suitable expedient available in a given installation. For units of the type illustrated herein, the subjection of the filter media forming the conduits generally to sequential cleaning operations in the direction of dirty gas flow, i.e., from top to bottom, and specifically and preferredly including a progressive increase in the quanta of effective cleaning in accord with the direction of flow of the dirty gas stream therepast is readily facilitated by the compartmentalized nature of the vertically superposed filter chambers and by the utilization of the pulse-jet cleaning techniques, which, for example, conveniently permit the preselection of the number of times that each filter chamber is cleaned in accordance with its relative vertical position intermediate the dirty gas entry plenum and the material receiving hopper as well as facilitate selective variation in the timing and character of the released jets.

Thus, in a unit of the type illustrated in FIG. 2, a suitable sequence of pulse jet cleaning operations would be to first selectively subject the socks 140 to a pulse jet cleaning operation which would effectively dislodge at least a portion of the particulate matter that had accumulated on or in the permeable media and thereby generally reintroduce the same, oftentimes in partially agglomerated form, into the downwardly moving dirty gas stream. Subsequent thereto and after a predetermined time interval, the socks 141 would be selectively subjected to a pulse jet cleaning operation which would effectively dislodge at least a portion of the particulate matter that had accumulated on or in the permeable media, including at least a portion of the solids that had been previously dislodged from the socks 140, and thereby reintroduce the same into the downwardly moving air streams. In a similar manner, the subsequent subjection of the lowermost group of filter socks 142 to a selective pulse jet cleaning operation will result in a dislodgement of at least a portion of the particulate matter that had accumulated on or in such permeable media to permit a largely gravity induced descent thereof into the hopper 119.

The progressive directional transition or sequencing of the cleaning operations concurrent to the direction of dirty gas flow results, probably because of the effective continuity of concurrent displacement of the accumulated particulate matter and gas flow and possible agglomeration of the accumulated particulate matter with its concomitant gravity enhanced downward displacement, in a markedly higher efficiency of cleaning of the media and is reflected in increased gas handling capacity. As noted earlier, however, even further increases in operational efficiency and air handling capacity are obtained when the lowermost portions of the filter media are subjected to preferentially greater cleaning. In initially instituted experimental operations to date on a three chamber unit of the type illustrated in FIG. 2 incorporating 10 foot cotton sateen filter socks in each chamber, talc No. 319 of Wittaker, Clark and Daniels Co. as the particulate matter and applied gas jet cleaning in the gas exit apertures located at the midpoint of each chamber, the following results generally indicate the comparative nature of the results obtained through practice of the above described methods:

EXAMPLE A

| | |
|---|---|
| Pressure drop | — 3.35 inches of water |
| Dust load | — 5.65 grains/cu. ft. |
| High Pressure Air | — 90 p.s.i. |

Under the above conditions and utilizing single jet pulses of 0.7 seconds duration in the following sequences: Top chamber (2 min.) — Middle chamber (2 min.) — Bottom chamber (2 min.); a face velocity of 1.67 cubic feet of air per square foot of filter media which is conventionally expressed as feet per minute, was obtained.

EXAMPLE B

| | |
|---|---|
| Pressure drop | — 3.5 inches of water |
| Dust load | — 6.13 grains/cu.ft. |
| High Pressure Air | — 90 p.s.i. |

Under the above conditions and utilizing single jet pulses of 0.7 seconds duration in the following sequence: Top chamber (2 min.) — Bottom chamber (2 min.) — Middle chamber (2 min.) — Bottom chamber (2 min.); a face velocity of 2.04 feet per minute, was obtained.

EXAMPLE C

| | |
|---|---|
| Pressure drop | — 3.5 inches of water |
| Dust load | — 6.13 grains/cu. ft. |
| High Pressure Air | — 90 p.s.i. |

Under the above conditions and utilizing a single jet pulse of 0.7 seconds duration in the following sequence: Top chamber (3 sec.) — Middle chamber (3 sec.) — Bottom chamber (6 min.); a face velocity of 2.43 feet per minute was obtained.

EXAMPLE D

| | |
|---|---|
| Pressure drop | — 3.5 inches of water |
| Dust load | — 5.92 grains/cu. ft. |
| High pressure gas | — 90 p.s.i. |

Under the above conditions and utilizing a single jet pulse of 0.7 seconds duration in the following sequence: Top chamber (4 sec.) — Bottom chamber (3 min.) — Middle chamber (4 sec.) — Bottom chamber (3 min.); a face velocity of 2.27 feet per minute was obtained.

EXAMPLE E

| | |
|---|---|
| Pressure drop | — 3.5 inches of water |
| Dust load | — 5.89 grains/cu.ft. |
| High pressure gas | — 90 p.s.i. |

Under the above conditions and utilizing a single jet pulse of 0.7 seconds duration in the following sequence: Top chamber (2 min.) — Bottom chamber (2 min.) — Middle chamber (2 min.) — Bottom chamber (2 min.) — Middle chamber (2 min.) — Bottom chamber (2 min.); a face velocity of 2.12 feet per minute was obtained.

As evidenced by the following preliminary data, the utilization of miltipulsing techniques apparently provides a further improvement in the results obtained.

EXAMPLE F

| | |
|---|---|
| Pressure drop | — 3.5 inches of water |
| Dust load | — 5.89 grains/cu. ft. |
| High pressure air | —90 p.s.i. |

Under the above conditions and utilizing a multipulse formed of six pulses of 0.7 seconds duration separated by a 0.1 second interval in the following sequence: Top chamber (4 secs.) — Middle chamber (4 secs.) — Bottom chamber 4 secs.) — Bottom chamber (6 minutes); a face velocity of 2.79 feet per second was obtained.

EXAMPLE G

The above run was repeated utilizing a multipulse formed of six pulses of 0.2 seconds duration separated by a 0.1 second interval; and a face velocity of 2.69 feet per second was obtained.

In accord with the dictates of the patent statutes, I have herein disclosed and described the presently preferred embodiments that incorporate the principles of my invention, however it will now be apparent that practice of the invention is not limited to the disclosed embodiments and many variants may occur to those skilled in this art that will differ from that which is disclosed herein but which will be encompassed within the scope of the appended claims.

Having thus described my invention, I claim:

1. In the separation of particulate matter from a gaseous carrier thereof, the steps of
    moving said gaseous carrier and particulate matter entrained therewith into the top of and downwardly through an elongate continuous vertically oriented conduit of substantially uniform cross-sectional configuration formed at least in part of permeable filter medium which constitutes the gas entry apertures of a plurality of conduit interconnected discrete filter chambers disposed in adjacent vertically superposed relation, each of said chambers being perimetrically defined by gas impervious wall means and vertically spaced transversely disposed tube sheet means, and
    selectively inducing separated flows of said gaseous carrier through each of said vertically superposed filter chambers and the portions of said permeable filter medium constituting the entry apertures thereof to separate the carrier entrained particulate matter therefrom.

2. The method as set forth in claim 1 including the step of individually subjecting the filter medium associated with each of said discrete filter chambers to a selective cleaning operation to renew the permeability thereof.

3. The method as set forth in claim 2 including the step
    of subjecting the filter medium associated with each of said discrete filter chambers to said selective cleaning operation in preselected sequence that is, at least in part, directionally concurrent to the direction of flow of said gaseous carrier through said elongate vertically oriented conduit to effect an over-all composite displacement of said particulate matter to the lower end thereof.

4. The method as set forth in claim 1 including the step
    of preferentially subjecting the portions of said filter medium associated with the lower most filter chambers to a greater quanta of effective cleaning than the portions of filter media associated with the uppermost filter chambers.

5. In the separation of particulate matter from a gaseous carrier thereof, the steps of
    moving said gaseous carrier and particulate matter entrained therewith into the upper end of and downwardly through an elongate continuous vertically oriented conduit of substantially uniform cross-sectional configuration formed at least in part of permeable filter medium which constitutes the gas entry apertures of a plurality of conduit interconnected discrete filter chambers disposed in abutting vertically superposed relation, each said chamber being perimetrically defined by gas impervious wall means and vertically spaced transversely disposed tube sheet means,
    inducing separate and discrete normal filtering flows of said gaseous carrier through each of said filter chambers through ever-open outlet apertures therefor and through the portions of said permeable filter medium constituting the entry apertures thereof to separate the carrier entrained particulate matter therefrom.
    momentarily and simultaneously stopping the normal filtering flow of gaseous carrier through each of said ever-open outlet apertures and reversing the direction of normal flow of gaseous carrier through the filter medium constituting the entry apertures of each of said discrete filter chambers by selectively and individually releasing bursts of high energy fluid over the cross-sectional areas of the outlet apertures thereof and through said apertures to cause on the downstream side of the filter medium associated with each said chamber an abrupt momentary pressure rise and a short sudden reverse flow of fluid therethrough to dislodge particulate matter accumulated thereon and displace the same toward the longitudinal axis of said conduit.

6. The method as set forth in claim 5 including the step of releasing said bursts of high energy gas in predetermined sequence that, at least in part, effects successive dislodgement of particulate matter directionally concurrent to the direction of flow of said gaseous carrier through said conduit to effect an over-all composite displacement of said particulate matter to the lower end thereof.

7. The method as set forth in claim 6 including the step of preferentially subjecting the lowermost portions of said filter medium to a greater quanta of effective cleaning than the uppermost portions thereof.

8. In the separation of particulate matter from a gaseous carrier thereof, the steps of moving said gaseous carrier and particulate matter entrained therewith into the upper end of and downwardly through an elongate vertically oriented conduit of substantially uniform cross-sectional configuration formed at least in part of permeable filter medium which constitutes the gas entry apertures of a plurality of discrete filter chambers disposed in vertically superposed relation and inducing separate and discrete normal filtering flows of said gaseous carrier through each of said filter chambers through ever-open outlet apertures therefor and through the portions of said permeable filter medium constituting the entry apertures thereof to remove the particulate matter entrained therewith, momentarily and simultaneously stopping the normal filtering flow of gaseous carrier through each of said ever-open outlet apertures and reversing the direction of normal flow of gaseous carrier through the filter medium constituting the entry apertures of each of said discrete filter chambers by selectively and individually releasing bursts of high energy fluid over the cross-sectional areas of the outlet apertures thereof and through said apertures to cause on the downstream side of the filter medium associated with each said chamber an abrupt momentary pressure rise and a short sudden reverse flow of fluid therethrough to dislodge particulate matter accumulated thereon and displace the same toward the longitudinal axis of said conduit, and releasing said bursts of high energy gas in predetermined sequence that; at least in part, effects successive dislodgement of particulate matter directionally concurrent to the direction of flow of said gaseous carrier through said conduit to effect an over-all composite displacement of said particulate matter to the lower end thereof.

9. In the separation of particulate matter from a gaseous carrier thereof, the steps of moving said gaseous carrier and particulate matter entrained therewith into the upper end of and downwardly through an elongate vertically oriented conduit of substantially uniform cross-sectional configuration formed at least in part of permeable filter medium which constitutes the gas entry apertures of a plurality of discrete filter chambers disposed in vertically superposed relation and inducing separate and discrete normal filtering flows of said gaseous carrier through each of said filter chambers through ever-open outlet apertures therefor and through the portions of said permeable filter medium constituting the entry apertures thereof to remove the particulate matter entrained therewith, momentarily and simultaneously stopping the normal filtering flow of gaseous carrier through each of said ever-open outlet apertures and reversing the direction of normal flow of gaseous carrier through the filter medium constituting the entry apertures of each of said discrete filter chambers by selectively and individually releasing bursts of high energy fluid over the cross-sectional areas of the outlet apertures thereof and through said apertures to cause on the downstream side of the filter medium associated with each said chamber an abrupt momentary pressure rise and a short sudden reverse flow of fluid therethrough to dislodge particulate matter accumulated thereon and displace the same toward the longitudinal axis of said conduit, and preferentially subjecting the lowermost portions of said filter medium to a greater quanta of effective cleaning than the uppermost portions thereof.

* * * * *